United States Patent [19]

Jönsson

[11] 4,292,335

[45] Sep. 29, 1981

[54] METHOD FOR SEPARATING THE FRUIT FLESH OF NUTS OR KERNELS INTO FIBRE MASS, OIL AND CELL LIQUID

[76] Inventor: Olof Jönsson, Druttningtorget 3, S-211 25 Malmö, Sweden

[21] Appl. No.: 102,511

[22] Filed: Dec. 11, 1979

[30] Foreign Application Priority Data

Dec. 21, 1978 [SE]  Sweden ............................... 7813155

[51] Int. Cl.³ ............................................. A23L 1/36
[52] U.S. Cl. ..................................... 426/489; 426/617
[58] Field of Search ....................... 426/489, 617, 478

[56] References Cited

U.S. PATENT DOCUMENTS

| | | | |
|---|---|---|---|
| 1,097,607 | 5/1914 | Ames | 426/489 |
| 1,366,339 | 1/1921 | Alexander | 426/489 |
| 2,812,255 | 11/1957 | MacDougall | 426/617 |
| 4,009,290 | 2/1977 | Okumori et al. | 426/489 |

*Primary Examiner*—Jeanette M. Hunter
*Attorney, Agent, or Firm*—Ladas & Parry

[57] ABSTRACT

A method of separating the fruit flesh of nuts or kernels into a fibre mass, oil and cell liquid by tempering the fruit flesh to a temperature at which the oil is in fluid form without the proteins coagulating, comminuting by cutting and, in the exact moment of the cutting, centrifuging so that, the fruit flesh is divided into a fibre mass and a liquid mixture comprising oil and cell liquid, and, any occurring natural emulsions are broken down. The fibre mass is then separated from the liquid mixture by means of filtration.

4 Claims, No Drawings

METHOD FOR SEPARATING THE FRUIT FLESH OF NUTS OR KERNELS INTO FIBRE MASS, OIL AND CELL LIQUID

The present invention relates to a method for separating the fruit flesh of nuts or kernels into fibre mass, oil and cell liquid.

It has long been known in this art to extract, by pressing, oil from copra or the dried flesh of the coconut. Similarly, extraction of this dried product by solvents is also practised in the art. In both cases there is obtained a residue, usable in animal fodder, which contains a fibre fraction and the coagulated proteins present in the coconut, as well as carbohydrates. It is also known in the art to shred the fresh nut and thereafter dry the shredded product and produce coconut flakes or coconut flour for baking etc. In conjunction with this manufacture, it is further a nown practice to remove a certain amount of the oil in order to obtain so-called low-calorie coconut flakes.

A still further known practice in the art is to finely grind the fresh coconut in a ball mill so that coconut milk is obtained. It is also known that the fraction which floats up from such a ground product may, after cooling, be rendered such that a churning process for phase conversion of the same type as that between cream and butter may be carried out. However, when the coconut is processed in the ball mill, water is added to render the grinding process more effective. The ground fibre fraction is also difficult to separate from the cream and butter.

Finally, it is also known to extract oil directly from the fresh nut, but the methods which have hitherto been used have not become as popular as they might, because they are too expensive and energy-consuming. In other words, these methods are not of the simple type.

These proteins to be found in the coconut are of a composition which, as far as amino acids are concerned, renders them particularly valuable. However, the processes utilized have reduced the value of these proteins since they have caused coagulation. It is a known fact that the coconut palm grows in areas of the world where an addition of proteins to the food would be of particularly great value, for which reason the extraction of proteins from the coconut is of vital importance. No particular study has been carried out of the use of the carbohydrates present, but their value in conjunction with the proteins should be of importance. The dilution of the cell liquid, which always takes place in these processes, has also constituted a bar to the most economical extraction of valuable products.

Characteristic of the exploitation hitherto of the coconut is that industry has concentrated either on the oil or on the coconut flakes. It has been perceived that a higher quality of oil may be obtained from the fresh nut, but industry has been obliged to disregard this. Persons skilled in this art have remained in ignorance of the technical stages which are required for an extraction of all fractions simultaneously in order thereby to give the nut a total economic value by balancing between fibre fraction, oil fraction and protein-carbohydrate fraction. It may be said that the fruit flesh of the coconut may theoretically be divided into a fibre fraction, a cell liquid fraction and a fat fraction (oil). A certain amount of residual protein and cabohydrates may be included in the fibre fraction if such is desired for the use of the fibre fraction. Proteins and carbohydrates are to be found in the cell liquid and some of these substances are also, naturally, included in the fat. However, it would constitute a highly desirable advance in the art to be able, in a simple manner, to extract the oil in pure form by some direct method.

Fibre, cell liquid and oil have different physical and chemical properties, such as specific weight, texture and hydrophobic-hydrophilic reactions by a dissolution of int. al. the proteins. An attempt to comminute a fresh coconut kernel manually using a grater will show how hydrophilic-hydrophobic properties assert themselves. They render such comminution extremely difficult and contribute to the realization of an undesirable, reinforced emulsification. No separation into different phases is obtained. The theoretical ideal would be to separate at once the fibre fraction from the oil and the aqueous phase. Furthermore, a mechanically correct comminution would further eliminate any tendency to emulsification of oil and water. Moreover, if the fibre fraction can, in a simple manner, be washed to different degrees according to need for obtaining regulated residue of fat, protein and soluble carbohydrates, this would involve progress. If a certain breaking down of natural emulsion can take place simultaneously or sequentially for facilitating a later separation of oil from cell liquid, this would constitute further progress. Then, fresh coconut kernels could simply be divided up into valuable component parts with a series of contemplated uses. The fibre fraction could, for example, be used for coconut flakes or flour, in which instance the oil content, protein content, carbohydrate content, flavour and nutritive value could be adapted for human food or animal fodder uses.

The cell liquid contains the major part of dissolved proteins, carbohydrates and salts in such concentrated form that further purification thereof is possible, provided that the liquid phase is treated in such a manner that the protein phase does not coagulate.

The fat or oil phase must, in order to retain durability, be in pure form and, therefore, the oil should be anhydrous and, as far as is possible, free of proteins and carbohydrates.

The present invention relates to a method of separating the fruit flesh of nuts or kernels into fibre mass, oil and cell liquid, the fruit flesh being comminuted to particle form, wherein the fruit fresh is, prior to the comminution, tempered to a temperature at which the oil is in liquid form without the proteins coagulating, wherein the fruit flesh is comminuted by cutting and, in the exact moment of the cutting, is subjected to such centrifugal force that, on the one hand, the fruit flesh is divided into a fibre mass and a liquid mixture comprising oil and cell liquid, and, on the other hand, any possibly occurring natural emulsions are broken down, and wherein the fibre mass is separated from the liquid mixture by filtration.

As was mentioned above, the fruit flesh which is to be used in the method according to the present invention is to be tempered to a suitable temperature. The lower temperature limit is determined by that temperature at which the nut oil solidifies and is, for example, for coconut oil 21° C., for oil palm kernel oil 25°–30° C. and for peanut oil 0°–30° C. The higher temperature limit is determined by the temperature at which the proteins coagulate and is normally about 60°–70° C. Thus, the fruit flesh is to be tempered to a temperature at which the oil is in liquid form without the proteins coagulating, for example from 0° C. to 70° C. A practical temperature range for several types of nuts, such as coconuts is from 21° to 60° C.

The method may be carried out using a rapidly rotating disc with cutters provided on one side against which the pieces of fruit flesh are mechanically urged for the contemplated comminution, the pieces flung out by the centrifugal force being caught by mechanical devices and led off according to calculable known rules for centrifuging, such that separation is effected into fibres, cell liquid and oil.

In order to regulate the composition of the fibre mass for its further use, the centrifuge may be provided with devices for pouring variable amounts of oil, coconut water (the natural water of the nuts), coconut cell liquid or temperate water onto the fibre mass while the centrifuging process is in operation, the excess being filtered off from the centrifuge.

After the above operation is completed, the fibre mass may be dried in a known manner. The oil may be churned, if needed, for reversing the oil-in-water phase into a water-in-oil phase, and may then be purified in a known manner by slight heating for flocculation of the proteins which are readily separated off. The cell liquid fraction is treated in a suitable manner for extracting protein and carbohydrate separately or in mixture.

One great advantage of the above-described method is that the comminution of the coconut is solved such that the cutting tool (the disc) automatically cleans itself throughout the operation due to centrifugal force. The disc should be designed such that it may easily be replaced by a disc having a different size of cutting teeth. Different qualities of the coconuts and various other desires, for example, an improvement of the oil yield, render it, necessary to provide different sizes and shapes of the cutting teeth. The outer regions of the disc may be designed for amplifying the separation effect of the three fractions: the fibres, the aqueous phase and the oil.

Apart from being used in the processing of coconuts, the method according to the invention may also be used for other nuts which are rich in cell liquid and fatty oils. Examples of such nuts are macadamia, peanuts and cashew nuts. Certain kernels, for example, avocado kernels and oil palm kernels may also come into consideration.

The following Example is given merely to show that the method according to the invention may be carried out with simple means. The invention should in no way be considered as restricted to this embodiment, but is, naturally, intended to be used on an industrial scale employing apparatuses with corresponding cutting and centrifuge functions.

EXAMPLE

In testing the method according to the invention, use was made of a Braun juice centrifuge extractor for household use (type MP 32 CH). The centrifuge works with a rapidly rotating disc (7000 rpm) with cutting teeth. Vegetables and fruit are intended to be forced against the disc for comminution. This apparatus carried out, albeit incompletely, the comminution which contemplated according to the invention. In the brochure which accompanies this household appliance, a number of uses are listed for the juice centrifuge, but without any mention of nuts. The appliance is only intended for the preparation of juice and not for the collection of the filtered-off portion. Neither would a person skilled in the art perceive that the centrifuging which happens to be carried out would have advantageous effects on the emulsions of interest in conjunction with the present invention.

Feeding fruit flesh from fresh Kenyan coconuts into the appliance resulted in a separation of a fibre fraction, and an aqueous fraction and a fat fraction being extracted in the form of a very loose emulsion. After being allowed to stand about an hour, the cream fraction floated up to the surface and, after slight cooling, the oil could be stirred manually so that butter was formed, that is to say phase conversion took place. The cell liquid was separated off and united with the cell liquid below the cream layer. After separation to the greatest possible extent of cell liquid, the butter can be rinsed in cold water, like normal butter. After thorough rinsing, the butter may be stored in cold storage When heated, the butter melted easily and, at a sufficiently elevated temperature, the proteins were separated off. On further heating to 100° C., the water boiled off and a water-clear oil was obtained. This subsequently solidified to a shiny fat fully in accordance with coconut fat of the highest quality.

The fibre fraction remaining in the appliance may be washed with coconut water and with ordinary water. Further fat and cell liquid may thus be rinsed out. After a while the oil collects on the surface of the rinsing water and may be skimmed off and added to the cream in accordance with the above. Naturally, the rinsing operation may be dispensed with, in which case more oil remains in the fibre mass which constitutes the basis of coconut flakes. This fibre mass may easily be dried, an operation which has been carried out. It constitutes a residue which is free of impurities and, according to the fat and protein content, may be used for human food or animal fodder. The pressed cakes resulting from conventional coconut oil extraction may be replaced by this product.

By way of exemplification, it might be mentioned that the following components were obtained from a peeled coconut kernel:

46.7% wet mass of fibre mass for coconut flakes.
53% fat-cell liquid mixture which was divided into
    25.2% butter
    28.1% cell liquid, undiluted.

The wet mass as per the above contained approximately
    50% water, for which reason approximately:
    23% dry substance = coconut flakes.

All of the above-mentioned products may be purified and, if desired, it is possible to increase the yield of fat fraction with respect to the yield of fibre fraction.

In experiments which comprised rinsing of the fibre fraction with coconut water (kernel liquid) the following was obtained instead:

27.4% butter, the content of wet mass (fibre mass) falling to 42.6%.

All percentages are given in weight percent.

In this incomplete process carried out in a normal household appliance, the cell liquid fraction contained 14% dry substance and only 0.7% fat/oil. The ash content was approximately 2% and the remaining dry substance of approximately 12% was divided between protein and carbohydrate. The analyses carried out are, however, far too unreliable for a definite indication of the distribution. An analysis of the coconut butter showed a water content of 19% and a high quality butter of 73%.

I claim:

1. A method of separating the fruit flesh of nuts or kernels into fibre mass, oil and cell liquid, which comprises tempering the fruit flesh to a temperature of 0° to 70° C. at which the oil is in liquid form without the proteins coagulating, then cutting the fruit flesh to comminute it and, simultaneously, centrifuging it to divide it into a fibre mass and a liquid mixture comprising oil and cell liquid, and to break down natural emulsions, and filtering the fibre mass to separate it from the liquid mixture.

2. A method according to claim 1, wherein the fruit flesh is added in the form of fruit flesh from fresh coconuts.

3. A method according to claim 1, wherein the cutting of the fruit flesh is effected by means of a rotary disc provided with a plurality of cutting means.

4. A method according to claim 1, wherein, during the centrifuging operation, a liquid selected from the group consisting of coconut water, coconut cell liquid, oil, tempered water and mixtures thereof is poured over the fibre mass separated by the centrifuging.

* * * * *